United States Patent [19]
Bogda et al.

[11] 3,993,873
[45] Nov. 23, 1976

[54] DIGITAL SWITCHING FOR PABX TELEPHONE COMMUNICATION SYSTEMS

[75] Inventors: Michael Vincent Bogda; Richard J. Bousek, both of Plano; Frederick G. Doidge, Richardson; John W. Israel, Dallas, all of Tex.

[73] Assignee: Danray, Inc., Dallas, Tex.

[22] Filed: Jan. 31, 1975

[21] Appl. No.: 545,895

Related U.S. Application Data

[63] Continuation-in-part of Ser. No. 376,923, July 5, 1973, abandoned.

[52] U.S. Cl. .......................... 179/18 ES; 179/18 AD
[51] Int. Cl.² ........................................... H04Q 3/54
[58] Field of Search .......... 179/15 AT, 18 AF, 18 J, 179/18 ES, 18 AD

[56] References Cited
UNITED STATES PATENTS

| | | | |
|---|---|---|---|
| 3,603,737 | 9/1971 | LeDorh et al. .................. | 179/15 AP |
| 3,641,272 | 2/1972 | Pinet et al. ..................... | 179/15 AT |
| 3,889,067 | 6/1975 | Reed et al. ..................... | 179/18 J |

*Primary Examiner*—Thomas W. Brown

[57] ABSTRACT

Disclosed is a method and apparatus for digitally switching audio signals in a telephone communication system having a plurality of telephone stations with their voice communication channels selectively coupled by way of analog to digital and digital to analog converters through a switch matrix controlled from the output of a stored program controlled computer. The analog audio signals to be inputted to the digital switch matrix are converted to pulse width modulated digital signals, the digitized audio signals outputted from the matrix being reconverted to analog audio signals.

6 Claims, 13 Drawing Figures

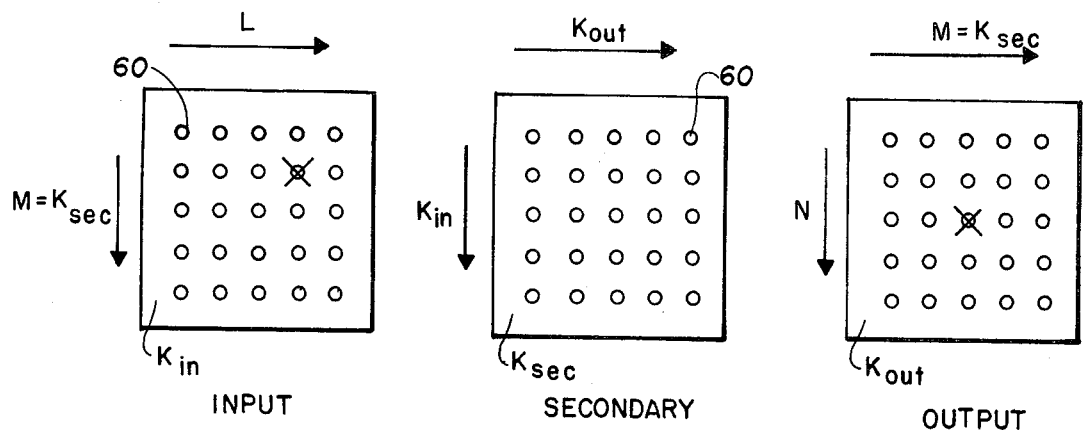

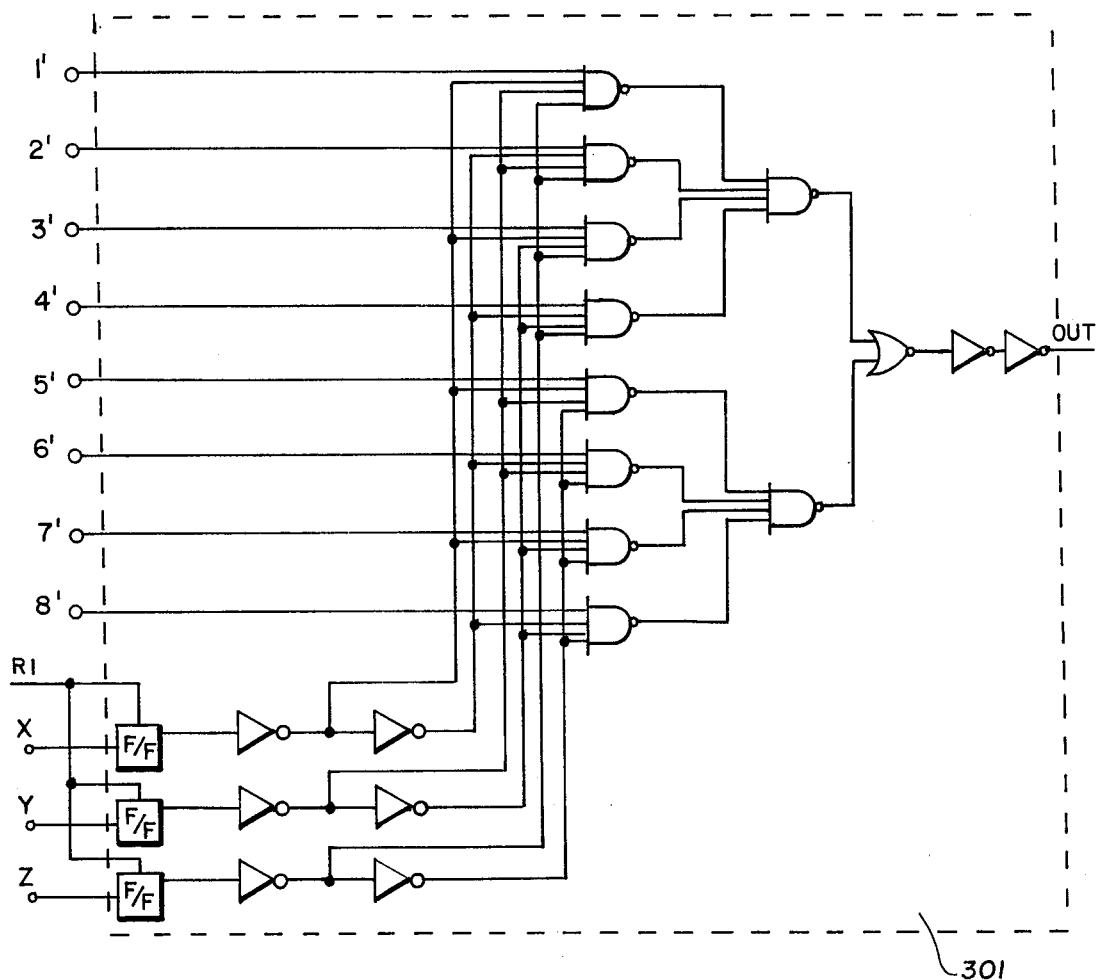
FIG. 9
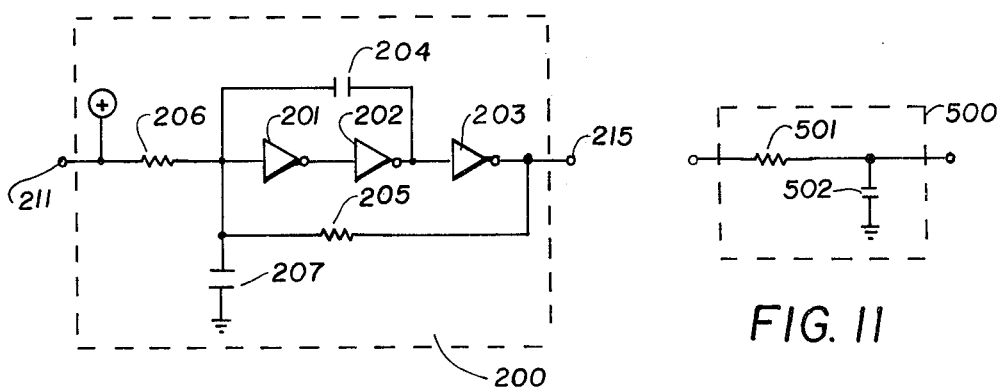
FIG. 10
FIG. 11

DIGITAL SWITCHING FOR PABX TELEPHONE COMMUNICATION SYSTEMS

This is continuation-in-part of copending application Ser. No. 376,923, filed July 5, 1973, now abandoned.

This invention relates to telephone communication systems, more particularly to self-contained private automatic branch exchanges, and even more particularly to improved audio signal switching in stored program controlled solid state space division switching networks for self-contained telephone communication systems.

With the ever increasing demands and complexity of modern day business, and the consequent necessity to maintain in rapid and reliable communication between the various segments of that business, it becomes necessary, indeed critical, that developments in telephone systems keep pace with these requirements. Specifically, telephone communication systems must not only possess a high degree of flexibility and be tailored to serve the specific needs of businesses, but they must be relatively inexpensive to install, maintain, and operate. Furthermore, they must be reliable over long periods of usage to avoid the costly repercussions that a failure or shutdown can cause to those businesses employing them.

To achieve these results, as well as to compensate for the inability of the major utility companies to design or operate there equipment on a national scale to meet these demands, many businesses have turned to privately owned self-contained telephone systems referred to as private branch exchanges (PBX) or private automatic branch exchanges (PABX). In addition to being specifically tailored to maintain effective and reliable intracompany communications, these telephone systems interface with the central office or exchange of the public systems.

While these private self-contained systems have generally served the purpose for which they were designed, they have not been completely satisfactory under all conditions of service. Specifically, and as representative of some of the disadvantages of existing systems, there has been a limitation on the expansion capability of the systems to offer the subscribers thereto additional features on a selective basis; an unnecessary amount of time is involved in selectively connecting stations of a system to establish the required communication link; and the failure of critical portions of the system has produced unacceptable interruptions in the communication network.

In the development of switching systems, technology of late appears to be favoring time division switching over space division switching. Time division switching, however, requires very complex circuitry, especially for modulators and demodulators. Space division switching, on the other hand, lends itself to the simplication of modulators and demodulators.

In copending application Ser. No. 376,872, filed July 5, 1973, now abandoned and assigned to the assignee of the present application, a unique PABX system utilizing stored program controlled solid state space division switching of the voice communication or audio signals is described which overcomes many of the disadvantages of prior art systems. Switching in that system, however, involves the use of a plurality of solid state switches which route the audio signals, in their analog format, between the telephone sets being connected. While this approach is acceptable for many conditions of service, the commercial availability of a wide range of integrated circuit digital networks now enables a minimizing of cost, space, and complexity of the overall system by eliminating, wherever possible, analog circuitry. Space division switches have inherently much greater bandwidth capacity that time division switches. A particularly simple analog to digital modulation scheme to implement is pulse width modulation, which requiresa large bandwidth. It would therefore appear to be extremely advantageous to combine space division switching with pulse width modulation.

It is therefore a primary object of the invention to provide a new and improved private self-contained telephone communication system.

It is another object of the invention to provide new and improved audio signal switching in a private automatic branch exchange system.

It is another object of the invention to provide a new and improved PABX system utilizing digital signal space division switching which provides rapid coupling of communication paths and the audio signals thereon between two or more stations of the system, offers a high degree of flexibility, is highly rellіable, and is relatively inexpensive to install, maintain, and operate.

In accordance with these and other objects, the telephone communication system of the present invention comprises a plurality of telephone stations having their respective voice communication channels coupled to a remotely located space division switching network, the switching network, upon command, selectively coupling the audio signals on the respective transmission and receiving channels of two or more stations to provide a communication path between the calling and called parties. The switching network comprises a multi-stage matrix of uniquely interconnected modular switches having arrays of switching elements defining crosspoints, selected crosspoints defining a plurality of alternate non-blocking switching paths for establishing the desired communication link, the switching elements comprising a plurality of interconnected solid state components.

Control of the switching network is effected in response to output signals generated by a stored program controlled general purpose computer which responds to command signals transmitted along control channels coupled to the telephone stations of the system, the control channels being separate and apart from the voice communication channels. Under control of uniquely designed programs, and with reference to data within a memory unit connected with the computer, the computer establishes optimum switching paths for defining the required communication links, taking into consideration any defective switching elements or "crosspoints" in the switching matrix; provides control signals for generating special functions between stations; and provides intercommunication between subscriber stations within the system and central exchanges outside the system.

In accordance with a unique feature of the present invention, the audio signals being inputted to the switching matrix are initially converted from analog format to pulse width modulated digital signals digital signals representative of the audio information, then selectively switched by digital switching apparatus forming the switching matrix to the selected output therefrom, and thereafter reconverted to analog format.

Additional features, as well as other objects and advantages, of the invention may be more readily appreciated from the following detailed description, taken in conjuction with the accompanying drawing. in which:

FIG. 3 is a coordinate data representation of the switches or crosspoints of each switching module of the input, output, and intermediate switch stages of the switch matrix illustrated in FIG. 2 along with the representation of the relationship between crosspoints of each stage;

Figure 2:
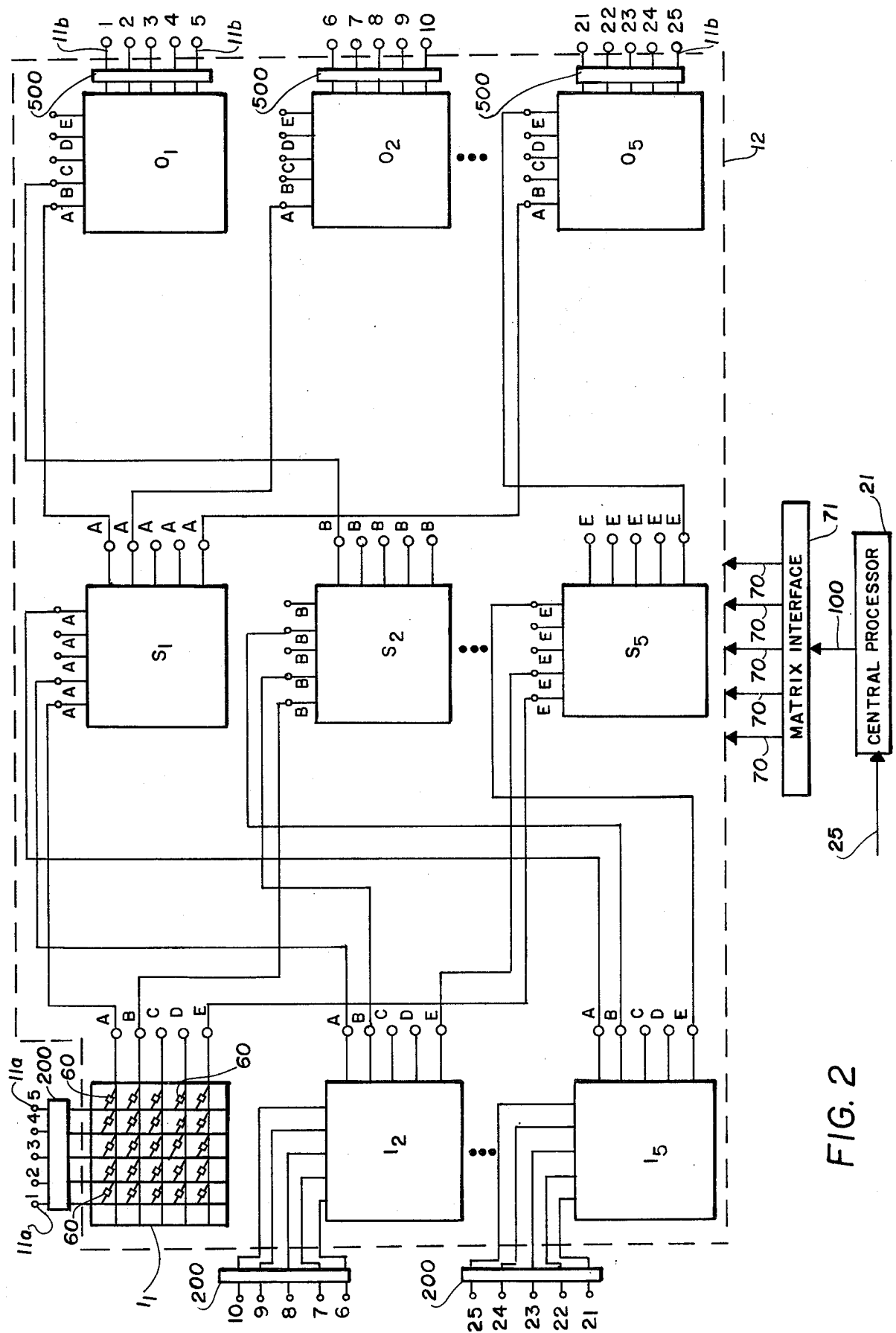
FIG. 2 is a diagrammatic representation of the switch matrix of the system depicted in FIG. 1 illustrating a preferred interconnection scheme between switch modules of the matrix.
Figure 5:
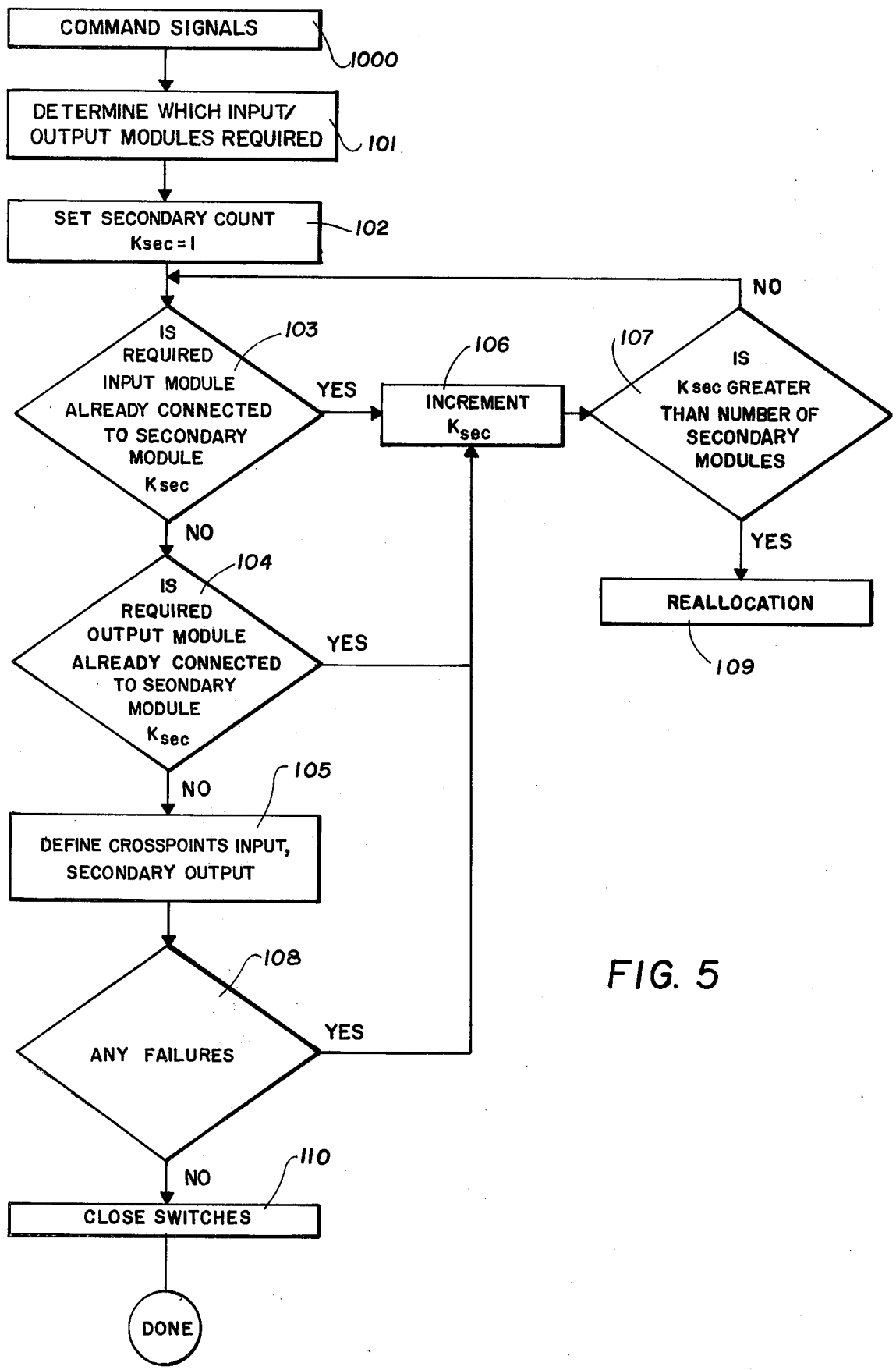
Figure 6:
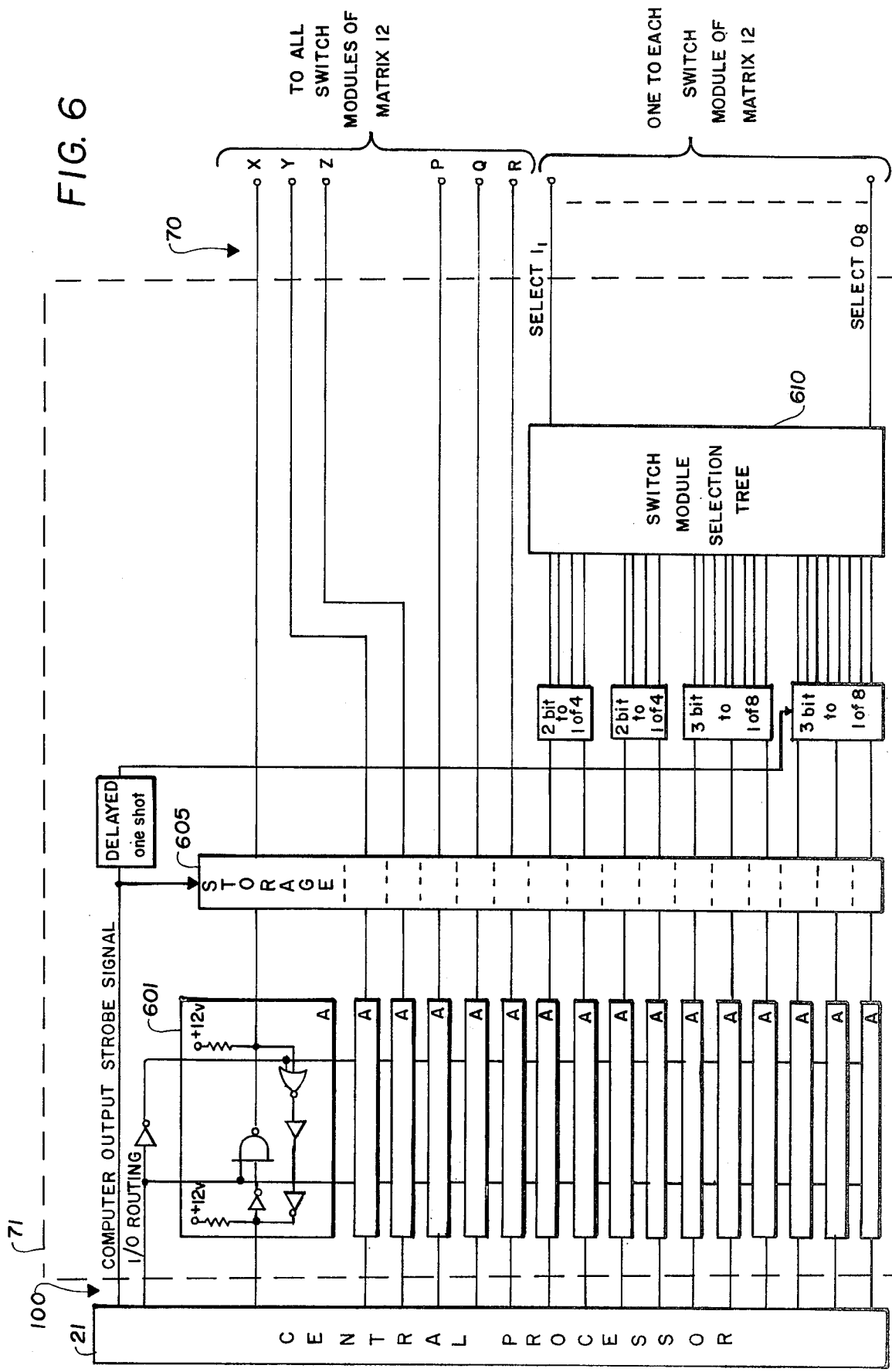
Figure 7:
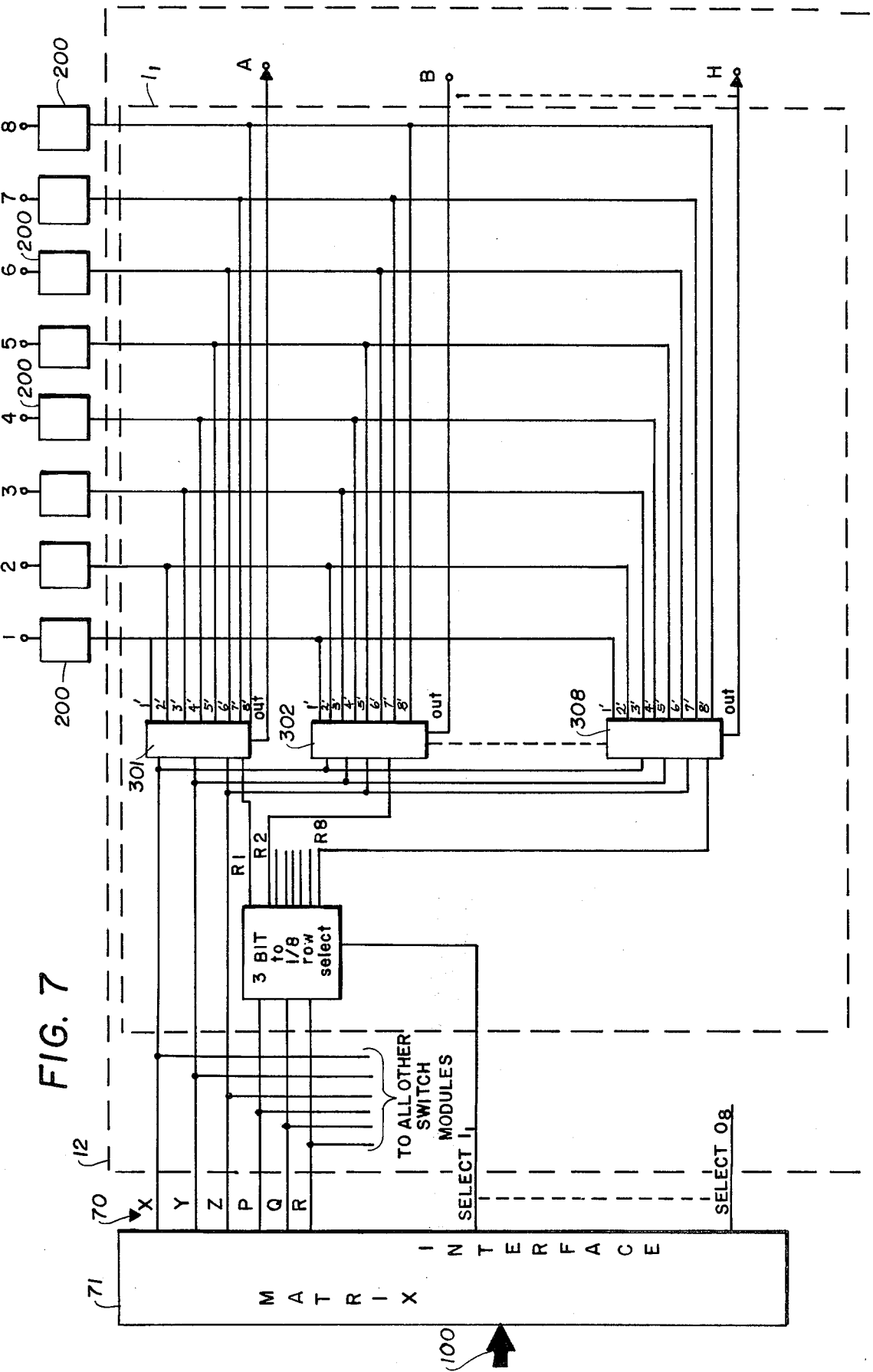
Figure 8:
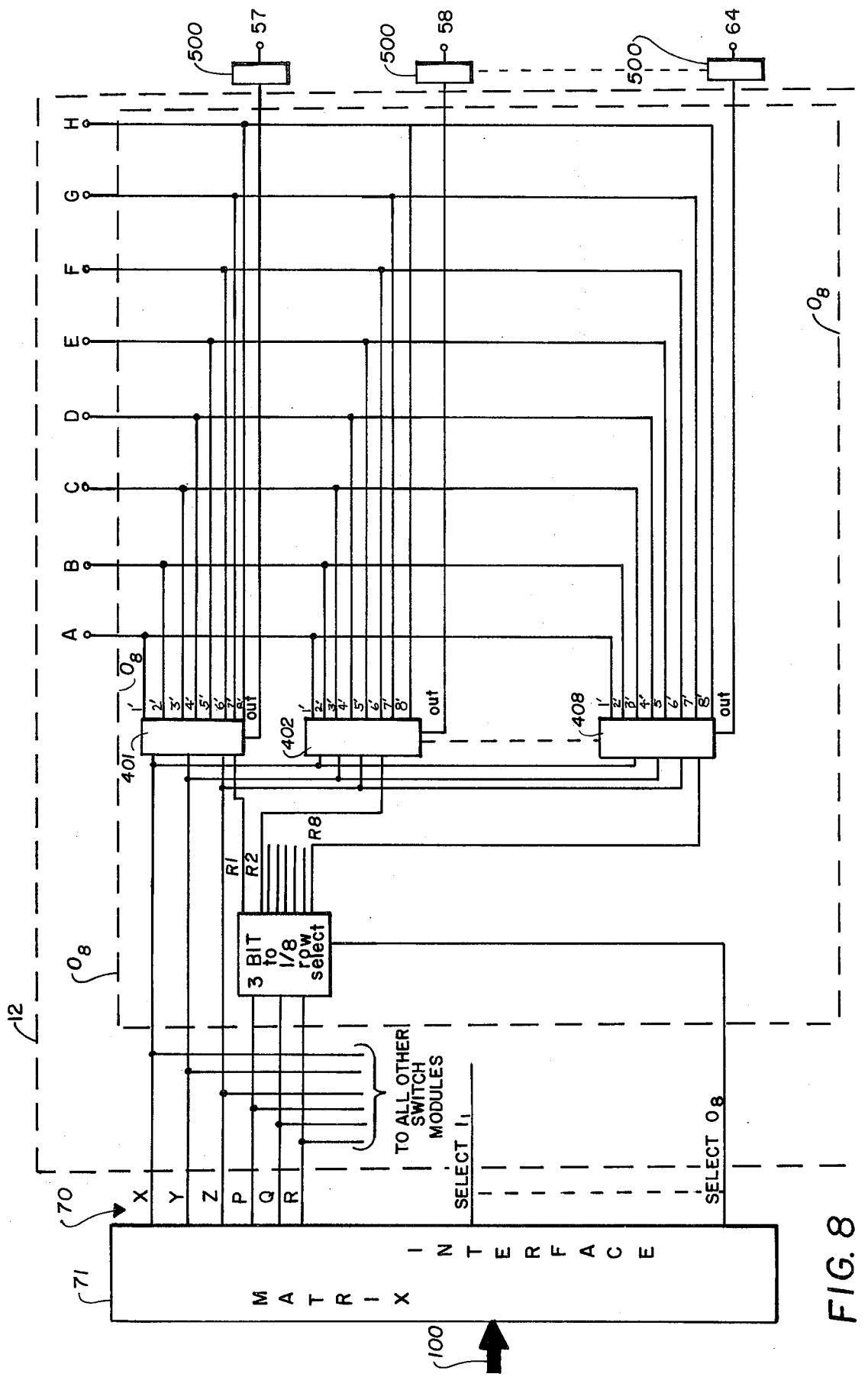

FIGS. 4A, 4B, and 4C are graphic summaries of the computerized technique for the selection of specified crosspoints in the intermediate stage of the switching matrix;

FIG. 5 is a flow chart denoting the programmed steps utilized in effecting the required communication path interconnection;

FIG. 6 is an illustrative example of a matrix interface constructed in accordance with the principles of this invention for responding to output signals from the central processor and converting these into signals usable by the switch matrix for selectively closing crosspoints therein;

FIG. 7 is a diagrammatic representation of the digital switching approach in accordance with the present invention for routing the digital formatted audio signals through the input stage of the matrix illustrated in FIG. 2;

FIG. 8 is a diagrammatic representation of the digital approach in accordance with the present invention for routing the digital formatted audio signals through the output stage of the matrix illustrated in FIG. 2, and thereafter through the D to A convertor;

FIG. 9 is a schematic logic diagram representation of a typical example of a digital switch utilized in the system shown in FIGS. 7 and 8;

FIG. 10 is a schematic illustration of a preferred form of A to D convertor; and FIG. 11 is a schematic illustration of a preferred form of D to A convertor.

Figure 1:
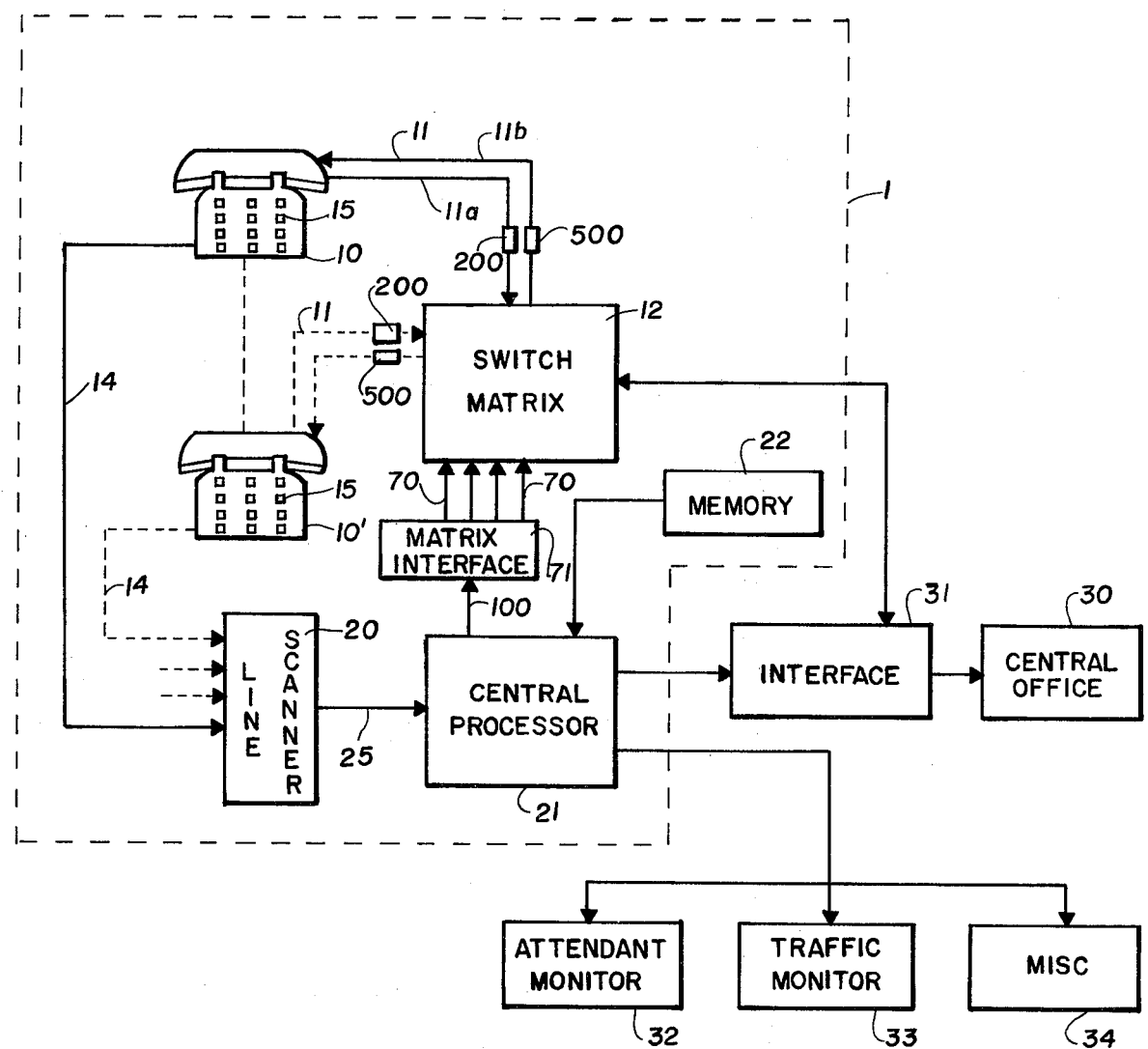
FIG. 1 is an overall block diagram of a PABX telephone communication system incorporating the improved audio signal switching in accordance with the principles of the present invention.

Referring initially to FIG. 1, there is illustrated the basic portions of the computerized private automatic branch exchange system in accordance with the principles of the invention. Specifically, the self-contained system (designated generally by the reference numeral 1) comprises a plurality of telephone sets or stations 10 having voice communication channels 11 respectively coupled by way of analog to digital (A to D) converters 200 and digital to analog (D to A) converters 500 to a switching matrix 12. For convenience in describing the invention herein, two such stations (designated 10 and 10') have been illustrated in the drawing, it being understood that many such stations may be so coupled, the only limit on the number of stations being the available switching paths in the matrix 12. Each voice communication channel 11 actually functionally comprises input and output channels 11a and 11b, respectively coupled by way of analog to digital converter 200 and digital to analog converter 500 with the mouthpiece and earpiece of the telephone sets 10 for respectively transmitting and receiving the voice signals between coupled stations, as subsequently described. While each of the stations 10 are illustrated as being coupled to the matrix 12 by way of a separate voice communication channel 11, it is also contemplated that a voice communication channel common to all stations may be employed by using multiplexing techniques known in the art.

Each of the sets 10 preferably has conventional pushbutton digital signal generators 15 for selectively producing signals which, in combination with line scanner 20, will implement the command or control signals for the operation subsequently described. Alternatively, and consistent with the principles of the invention, signals may be generated from a rotary dial mechanism of the type known in the art, the pushbutton digital signal generators, however, allowing a flexibility of signalling not conveniently available from rotary dial pulsing.

The telephone sets 10 may also include such additional features as signalling lamps and pushbuttons to allow such conventional operations as line-hold, busy signal indication, ringing indication, etc., these additional operations not essential to the present invention.

A switching matrix or network 12 is provided for selectively coupling, upon command, the input and output lines of the voice communication channels 11 of one or more of the stations 10 to establish a communication link therebetween, thereby routing the voice or audio signals between the phones 10 desiring to "talk" to one another. The matrix 12, the internal details of which are subsequently described, comprises a plurality of alternate switching paths, preferably non-blocking, the establishment of switch connections therebetween providing the necessary coupling or link between the voice communication channels of the calling and called stations.

As a unique feature of the present invention, the control of this switching matrix, and specifically the making and breaking of communication links therethrough, is computer controlled, the instructions for such communication linkage being initially implemented by appropriate control or instruction signals received from the stations 10. In this regard, each of the stations 10 has a channel 14 separate and distinct from the communication channel 11 for transmitting, on a substantially unlimited capability, signals representing the station being "called", each of the channels 14 coupled intermediate the signal or tone generating means 15 and a continuous line scanner 20. While each of the channels 14 are represented as separate control channels respectively coupled between the different subscriber stations 10 and the continuous line scanner 20, it is also possible to utilize conventional mulitplexing and have a common control data bus to which each of the signal generators of the respective instruments 10 are coupled. Furthermore, the tone signals being generated may, if desired, travel along the same wires transmitting the audio signals of the phones 10 for a given distance, and then be separated for inputting to the scanner 20, the audio signals being inputted to the matrix 12.

The principal function of the continuous line scanner 20 is to continually monitor each of the signal channels 14 coupled thereto to determine the presence of a "called party" instruction or control signal thereon identifying with which station the calling party wishes to communicate, to determine the "on-hook" or "offhook" status of the called party, and thereafter to generate a coded signal on line 25 which designates (1) the identification of the called party (which may be obtained, for example, by sensing, identifying, and registering the particular input channel 14, and therefore which phone set 10, from which the called party signal was received), and (2) the identification of the called party. Various types of conventional digital apparatus may be employed for the line scanner 20 which continuously monitors the input channels 14 and generates digital words representing the calling and called party, as indicated.

Coupled to the output of the line scanner 20 is a stored program controlled computer basically including a central processing unit 21 having an associated memory unit 22, the output of central processor 21 being coupled through matrix interface means 71 to the switch matrix 12. The primary function of the central processor 21 is to respond to the instruction or control signals received from the continuous line scanner 20 over line 25 to establish the required communication link between the input and output paths of the communication channels 11 of the respective stations. Accordingly, the processor will have included within or associated therewith conventional encoders or decoders, standard registers and computing elements, and suitable interface equipment. An example of a stored program controlled computer, including a memory, which may be utilized in a preferred embodiments of this invention is the Nova 1200 computer manufactured by Data General Corporation, Southboro, Massachusetts. A description of this computer, and the input/output requirements for interfacing therewith, may be found in the manual "How to Use the Nova Computers," published by Data General Corporation (DG NM-6, Oct. 1972).

Memory unit 22 has stored therein: (1) coded information corresponding to possible alternative switching paths with the matrix 12 defined by switching crosspoints therein which, if closed, will effect the required coupling between voice communication channels; (2) current status of availability of specific crosspoints; and (3) instruction programs for controlling and directing the operation of the central processor in response to the stored information and incoming control signals from line scanner 20.

The functions of central processor 21 and memory unit 22 can be briefly summarized as follows:

1. The generation of address signals to the matrix interface means 71 identifying the specific crosspoints of the matrix 12 to be "closed" to establish the desired linkage between the voice communication channels 11 of the specific calling and called stations 10 as identified by the instruction signal on lead 25.

2. The continuing evaluation of data corresponding to the switch matrix 12 to determine the status of switch crosspoints therein, and the generation of information about defective crosspoints;

3. The control of special functions between internal stations 10;

4. The control and establishment of intercommunication between internal stations 10 and an external central office exchange; and 5. The control and generation of additional functions external to the system 1.

The matrix interface means 71 has its input coupled to the output from central processor 21 over leads 100 and a plurality of outputs respectively coupled over leads 70 to the control terminals of switches (identified by reference numeral 60 in FIG. 2) disposed at each crosspoint of the matrix 12. The function of interface 71 is to accept the digitally encoded signals on leads 100 from the processor 21 (identifying crosspoints of the matrix 12 which are to be closed) and convert these address signals to appropriate logic level signals on leads 70 (high or low) applied to the control terminals of switches 60 for closing those switches across the crosspoints to be closed. Various types of conventional digital circuity presently known in the art may be employed to construct the interface means 71 to effect the required conversion and steer the logic signals to the appropriate switch input, as will be described in detail hereinafter.

ESTABLISHMENT OF COMMUNICATION BETWEEN STATIONS

The essential function of the processing unit 21 is to control the switch matrix 12 to establish the desired linkage between the communication paths 11. In accordance with the instructions from a unique program, the details of which will be subsequently described, stored in the memory 22, the central processor 21 effects such control in the following sequential manner: (a) it receives the connect instructions on lead 25 from continuous line scanner 20, verifies its completeness, and determines from such instructions which stations 10 are to be coupled; (b) it determines the availability of the called party; (c) by analyzing data stored within the memory unit 22, it determines the optimum switching path within the matrix to effect the required coupling; (d) by reference to memory, it monitors information corresponding to the status of the switches 60 at the crosspoints within the matrix 12 defining the optimum switching path and determines the availability of these crosspoints; (e) if the crosspoints are not available, it repeats steps (c) and (d) until an available path (crosspoints) is found; and (f) it deploys the digitally encoded address signal to the switch matrix interface means 71 to close the specific switches at these crosspoints to establish the necessary communication path therein. As is subsequently described, and as an additional unique feature of the invention, the processor 21 as a last resort, upon determination that one or more of the required crosspoints (or their substitues) are unavailable to effect the needed communication link, will reallocate crosspoints for existing communication paths in order to free up the desired path or link.

DIAGNOSTIC EVALUATION

As a specific feature of the invention, the central processor 21, in combination with the memory unit 22, also provides a diagnostic function to determine and identify the location of defective solid state switch crosspoints within the matrix 12. Specifically, the existence of a defective switch is directed into memory 22, the location of the defective switch crosspoints thereby being stored therein. To effect the coupling of the communication channels just described, the central processor 21, under control of a separate stored program detailed hereinafter, then takes into account these defective switch points, establishes a path rerouting in view of these defective switches, and generates output information about the location of these defective switch points.

SPECIAL FUNCTIONS

Under the control and direction of stored programs within the memory 22, the central processor 21 effects special functions, such as redirecting incoming calls to other stations in the event the called station line is busy, establishing priority breaks into communication links, etc. Each of these functions, as well as additional special functions, may be initated in response to special code signals generated by the pulse means 15 of the instruments 10.

INTERCOMMUNICATION

The flexibility of the computer controlled private automatic branch exchange of the present invention is exemplified by its ability not only to provide a wide range of communications between subscriber stations 10 within the system 1, but also to intercommunicate between these stations and phone stations coupled to an external central office exchange 30. This interconnection is effected by way of suitable interface equipment 31 coupled to the processor 21 and matrix 12.

EXTERNAL FUNCTIONS

Additional auxiliary equipment may be coupled, if desired, to the system 1, all under control of the processor 21. For example, an attendant monitor 32 may be utilized to monitor or override the automatic controls; a traffic monitor 33 may be employed to record the transactions carried out by the system; or other miscellaneous equipment 34 such as Teletypes, printers, etc. may be coupled thereto.

Referring now to FIG. 2, the switch matrix 12 for establishing voice communication link or transfer of audio signals between selected telephones 10 is depicted as comprising an input switch stage (consisting of input switch modules $I_1, I_2, \ldots I_N$) and an output stage (consisting of output switch modules $O_1, O_2, \ldots O_N$). The inputs to each of the input switch modules $I_1, I_2,$ etc., are respectively coupled by way of A to D converters 200 to the mouthpieces of the different telephone sets 10 by way of the input channels 11a which telephone sets have been designated for convenience as 1, 2, 3, etc. In similar manner, the outputs from output switch modules $O_1, O_2,$ etc., are respectively coupled by way of D to A convertors 500 and output channels 11b to the earpieces of different telephone sets 10, which sets for convenience have also been idenified as 1, 2, 3, etc.

In addition to the input and output stages, the matrix 12 may include an odd number of intermediate stages comprising a plurality of switch modules appropriately interconnected with the switch modules of the input and output stage. In accordance with a preferred embodiment of the invention, one such intermediate or secondary stage is illustrated in FIG. 2 having switch modules $S_1, S_2, \ldots S_N \approx 5$.

In accordance with preferred embodiment, each of the input switch modules $I_1, I_2,$ etc. and the output switch modules $O_1, O_2,$ etc., have the same number of inputs as outputs, it being understood that this is not essential to the operation of the system. Furthermore, for convenience of description, each input and output switch module is illustrated as having coupled thereto the input or output channels to five telephone sets, the switch matrix illustrated in FIG. 2 thus being capable of establishing a communication link between the mouthpiece and earpiece of 25 telephone sets. As a distinctive feature of the system, and to insure a communication link between each one of the telephone sets without the possibility of blocking, it is important that the outputs from any one input switch module be coupled to the inputs of different secondary switch modules, and that the inputs to any one output switch module be coupled to the outputs of different secondary switch modules. Thus, as illustrated in FIG. 2, the number of secondary switch modules $S_1, S_2,$ etc., are equal to the number of outputs from (or inputs to) the input or output modules. In the illustrated example, there would thus be five such secondary switch modules $S_1, S_2, S_3, S_4,$ and $S_5,$ in the intermediate or secondary stage of the matrix 12. As a consequence of this interconnection, the total available communication paths between a mouthpiece of any one telephone set to the earpiece of any other telephone set are equal to the number of secondary switches which, in the illustrative example, afford five alternate paths therebetween.

Each switch module has an array of switches 60, selected ones of which, when closed, selectively couple a respective input bus to an output bus. Such a switch array is illustrated with respect to input switch module $I_1$, it being understood that a similar type switch arrary would be included within each of the input, secondary, and output stage switch modules. As subsequently described in greater detail, to establish a communication link between the input channel 11a coupled to one phone to the output channel 11b of any other phone requires the closing of a specified switch 60 in the input stage, a specified switch 60 in the secondary stage, and a specified switch 60 in the output stage. In the specific illustrated example, there are five separate sets (a set composed of the three so specified switches) of switches which may be so closed (thus defining five separate paths) to establish the voice communication link.

Each of the switches 60 may be represented as illustrated in FIG. 3 by a matrix or array of circles respectively representing a potential interconnection situs (designated crosspoint) between an input and output bus bar. The interconnection of the earpiece of any one telephone set to the mouthpiece of any other telephone set (including itself) is thus provided by a path (or a number of alternate paths) defined by a set of crosspoints respectively located in the input, secondary, and output stages, there being five such paths (five such sets) in the illustrated example of FIG. 2.

Each crosspoints can be identified by coordinate data respectively representing the number of the switch module, its position in the horizontal direction, and its position in the vertical direction. Thus, when the input switch module is the first one (or$I_1$) of the input stage, the crosspoint designated with an $x$, for example, may be identified by the designation (1, 4, 2), the closing of this particular switch or crosspoint indicating the interconnection between the fourth input bus and second output bus. Similarly, when the switch module is the first one (or $O_1$) of the output stage the crosspoint designated by the $x$ may be identified by the designation (1, 3, 3), indicating the interconnection between the third input and third output bus thereof.

The determination of the specific crosspoints (switches 60) necessary to establish one of the desired communication paths is effected by the central processor 21 of a general purpose computer (and an associated utilization storage device or memory 22) in response to command signals received from the line scanner 20 which indicate the particular phones (channels) to be interconnected. Such determination is now described.

Stored within the memory 22 is not only the set of instructions to the processor 21 necessary to carry out the operation as subsequently described, but also the status (availability) of a crosspoint (switch in use or defective). As a unique feature herein, the respective crosspoints in the input, secondary, and output stages have a specific and defined relationship to one another as determined by the fixed interconnection between the inputs and outputs of the secondary switch modules and the outputs and inputs associated with the input and output switch modules, respectively. In accordance with the preferred embodiment of the invention, each of the respective outputs from any one input switch module is respecitvely coupled to corresponding inputs to different ones of the secondary switch modules; and respective inputs to any one output switch module is respectively coupled to corresponding outputs from the different secondary switch modules. Furthermore, the input of the secondary switch module which is coupled to an output to one of the input switch modules also has its corresponding output coupled to the same numbered input of the corresponding output switch module.

Specifically, and with reference to FIG. 2, all of the output terminals A–E of the input switch modules $I_1$–$I_5$ are connected to the corresponding lettered input terminals of the secondary switch modules; and the input terminals A–E to the output switch modules are also coupled to the corresponding lettered output terminals of the secondary switch modules. Additionally, it is noted that the first or A output terminal of the first input switch module $I_1$ is coupled to the first A input terminal of the secondary switch module $S_1$ which therefore requires that the first or A input terminal of the first output stage switch module $O_1$ be coupled to the first A output terminal from switch module $S_1$.

As a consequence of this just defined fixed interconnection scheme of the matrix 12, any set of three crosspoints necessary to effect the required communication path respectively located in the input, secondary, and output stages, are specifically related to one another in the manner illustrated in FIG. 3. Accordingly, the coordinates of the secondary switch crosspoint is defined as ($K_{sec}$, $K_{out}$, $K_{in}$) where $K_{out}$ and $K_{in}$ respectively represent the output switch module to which the desired output channel is coupled and the input switch module to which the desired input channel is coupled. Moreover, the horizontal position coordinate of the output switch module crosspoint is always equal to the vertical position coordinate of the input switch module crosspoint which in themselves will always be equal to the number of the particular secondary switch module $K_{sec}$ being used.

The foregoing relationship can be utilized to define the sequence of steps by which the required communication paths are established. Since the sequence will be effected under the control of a set of stored program instructions, the method of program algorithm basically includes the following steps in response to the receipt of the command signals on lead 25 indicating which input and output channels are to be coupled: (a) initially determining which input stage switching module and which output stage switching module are required to effect the coupling of the selected input and output channels; (b) selecting an available crosspoint of the intermediate or secondary stage; (c) selecting or determining the necessary crosspoints of the input and output stage switch modules as a consequence of the selection of the particular secondary switch module crosspoint; and (d) generating the address signals defining, in digital code, the set of three chosen crosspoints to close the required switches 60 and establish the communication path.

Stored within the memory 22 are digital words, which position within the memory and coding are indicative of the specific crosspoints of the switch modules and their status. For example, the rows of crosspoints of the primary switch modules may be defined by digital words, the location of a bit in the word representing the input terminal coupled thereto, and the status of the bit (0 or 1) indicating the open or closed nature of the switch. The relative locations of the rows to one another (i.e., the location in memory) can then define the particular output terminals. Similar coding may be effected for the crosspoints of the secondary and output modules, the digital words for each of these stages being disposed at different respective locations in memory.

In accordance with the process of the invention, the initial selection of which input and output switch modules are required may be effected by calculation initiated by the input command signals and constrained or determined by the coded information. Alternatively, coded data indicating which input channels and which output channels are respectively coupled to which input and output modules may be stored within the memory 22 and retrieved in response to the input command signals.

The crosspoint of the intermediate or secondary stage may be selected from a total possible number of available secondary state crosspoints equal to the number of switch modules in the secondary stage. For the example illustrated in FIG. 2, there are thus five possible acceptable crosspoints to choose from depending upon their respective availability. The availability of any particular crosspoint switch requires that no other crosspoint be in use (either closed as a result of a previous command or a failure) in either the row or column in which the desired crosspoint is located. For the interconnection scheme shown in FIG. 2, this availability will exist as long as neither the required input module nor the required output module is already connected to the secondary module of interest. This availability can be detected by the computer interrogating the memory, preferably on a sequential basis, as to the status of each acceptable secondary stage crosspoint for each of the secondary modules.

This technique can be summarized by reference now to FIGS. 4A through 4C wherein there is depicted a chart of the combined status of secondary stage crosspoints for each secondary module. The abscissa of each of the graphs of FIGS. 4A–4C correspond to the required input modules, and the ordinate of the chart corresponds to the secondary stage modules. Accordingly, assume that it is desired to couple the input channel of telephone set 1 to the output channel of telephone set 5. Since the telephone set 1 is coupled to, and thus requires the use of the input module $I_1$, the number 1 (which represents the required output module dicated by telephone set 5) may be placed (as one solution) within the northwesternmost block since there is no other number in that block (thus indicating that the required input module is not already connected to the first secondary module) and since there is no other number "1" in the same row (thus indicating that the required output module is not already connected to the first secondary module). Thus, the chosen secondary crosspoint is defined as (1, 1, 1).

Since it is obvious that the input channel to telephone set 5 should also be coupled to the output channel to telephone set 1, the determination of the required secondary crosspoint will be now effected for that condition. It is noted that both the first input module and first output module are still required to effect this coupling. However, the northwesternmost block of the graph FIG. 4A is already taken (thus indicating the existing connection of input $I_1$ module to the first secondary module) so the number 1 is inserted, for example, in the appropriate block in the second row, as illustrated in FIG. 4A.

Assume now that it is desired to couple the input channel from telephone set 10 to the output channel of telephone set 3, thus requiring the use of the second input module $I_2$ and the first output module $O_1$. With reference to the chart of FIG. 4A, it is noted that the block represented by the abscissa $I_2$ and the ordinate $S_1$ is available, thus indicating that the required input module $I_2$ is not already connected to the first secondary module. However, the number 1 (indicating the required output module $O_1$) cannot be placed in this block since the same number already exists in the first (and second) secondary module, thus requiring the placement of the number 1 in another row, for example the third row (representing the third secondary module), as illustrated in FIG. 4B. The secondary stage crosspoint is thus defined as (3, 2, 1).

In similar manner, the secondary stage crosspoints may be chosen to effect the required interconnection between the input and output channels of all telephone sets, one typical solution being summarized in FIG. 4C. Such a solution allows the utilization of all necessary crosspoints in the secondary stage to effect the required coupling between telephone sets without blocking.

The computerized selection of the particular secondary stage crosspoints can be effected preferably in one of two manners. First, the respective blocks of the chart represented in FIGs. 4A–4C may represent individual storage locations in memory 22 and the numbers 1 through 5 (corresponding to the required output modules) can be represented by multibit digital words directed into respective locations in storage. Thus, under control of the stored instruction, the respective secondary stage crosspoints may be selected. Alternatively, by utilizing the digital word coding previously described, and storing the digital words representing the crosspoints already in use, a determination can be made each time a new coupling is to be effected as to the availability of a particular crosspoint in the desired secondary stage module.

After each secondary stage crosspoint is defined, the particular crosspoint of the required input and output modules can be calculated since the M coordinate point shown in FIG. 3 is now defined by the number of the secondary module containing the selected secondary crosspoint. Thereafter, and at an appropriate time, a coded signal on leads 100 may be generated by the processor 21, which signal corresponds to the defined set of three crosspoints, and matrix interface means 71 may convert this coded signal on leads 100 into a plurality of high (1) logic signals in leads 70 directed to the control input of the switches 60 defined by the crosspoints, the switches 60 thereby being closed to effect the required communication coupling.

In many instances, a solution to effect the coupling of telephone sets is not possible without the necessity of reallocation or rearrangement of any set of crosspoints. Sometimes a defective crosspoint prevents the desired connection. Sometimes enough crosspoints are being utilized to block the setting up of the desired connection. In such instances, and under instructions of the stored program within the memory 22, the processor 21 will compute a new solution, and rearrange or reallocate another secondary crosspoint for an existing connection, thus freeing up the desired secondary crosspoint for the new connection being sought. In effect, this means that as a consequence of the reallocation, a different, but acceptable, communication path is defined to maintain the existing connection, and the new communication path may be established.

Referring now to FIG. 5, there is depicted a flow chart of the algorithm in accordance with a preferred embodiment of the present invention. Accordingly, the box 1000 indicates the generation of the command signals on lead 25 indicating the desired phones to be coupled, and the process box 101 indicates the determination of the required input and output modules pursuant to said command signals. The next step is denoted by box 102 whereby count is initially set at $K_{sec} = 1$ (first secondary module). The decision box 103 determines if the required input module is connected to the chosen secondary module. If the answer is "yes" with respect to $K_{sec} = 1$, then the $K_{sec}$ is incremented to $K_{sec} = 2, = 3$, etc., as represented by process box 106, until the answer from decision box 103 is "no". Once a no answer is received, the next step is determined by the decision box 104 as to whether the required output module is connected to the chosen secondary module $K_{sec}$ represented by the decision pursuant to box 103. If the answer is yes, the output is directed back to the incrementing operation represented by the process box 106, and the cycle is repeated until a no is received at the output of box 104 (thus indicating the available secondary module). The process box 105 then represents the definition of the particular crosspoints for the secondary, input, and output modules, a no answer from the failure inquiry process box 108 thereafter activating the switches 60 defined by the chosen crosspoints, as represented by the process box 110. The decision box 107 represents the determination of the availability of any secondary module $K_{sec}$, a yes answer therefrom indicating the necessity for reallocation, as previously described, as represented by the process box 109.

Referring now to FIGS. 6 through 11, depicted therein is exemplary improved apparatus constructed in accordance with the principles of the present invention for interconnecting the voice communication channels (and audio signals thereon) of each of the telephone sets 10. Turning now to FIG. 6, shown therein is an illustrative arrangement for the matrix interface 71 which accepts an address from central processor 21 and converts this address into a form suitable for use by switch matrix 12 to close selected crosspoints therein. The output of the exemplary processor 21 is designed to interface with TTL circuitry requiring three volt logic levels. Switch matrix 12 is illustratively comprised of CMOS integrated circuit elements operating with 12 volt logic levels. One of the functions of matrix interface 71 is therefore to provide the appropriate logic level conversions. Additionally, the exemplary processor 21 utilizes a single I/O bus which is time shared between the input and output signals. Therefore, a circuit such as that designated 601 is utilized to provide both the level conversion and the input-output routing. Since the exemplary processor 21 utilizes a 16 bit data word, 16 of the circuits referenced as 601 are required, one for each of the data bits. In order to simplify the drawing, the other 15 level shifters are shown below the one designated 601 and are referenced with the letter A in the lower right corners thereof. It should be noted that circuits 601 may be connected to other circuits, not shown, which send information back to processor 21.

At this time a brief discussion of the illustrative addressing scheme for addressing selected crosspoints is in order. Ten of the 16 bits are utilized to select one of the switch modules of matrix 12. Three of the bits are used to select a column of the selected module and the last three bits ae utilized to select a row of the selected module, thereby fully defining a single crosspoint in switch matrix 12. In the illustrative embodiment where switch matrix 12 comprises three levels of switching, central processor 21 would send through matrix interface 71 three sets of address bits to define the three crosspoints in the input, intermediate, and output stages, respectively, which must be closed to establish a communication link through switch matrix 12.

After the level conversion by circuits 601, the 16 data bits are strobed into the temporary storage unit 605 which may be comprised of an array of any of the known types of storage elements, such as flip-flops. Returning now to FIG. 6, it is seen that the six bits defining a crosspoint within a switch module go directly from storage 605 to matrix 12 over leads designated X, Y, Z, P, Q, and R. The 10 bits designating a particular switch module of matrix 12 go from storage 605 to matrix 12 after being further decoded. Two sets of two bits each are decoded to one of four signals and two sets of three bits each are decoded to one of eight signals, the last group of three bits being strobed and decoded after a delay from the computer output signal so as to insure that all bits in storage 605 have had an opportunity to change state. The four sets of decoded switch module address bits then go through switch module selection tree 610 which provides one lead for each switch module of matrix 12, up to a maximum of 1024.

Turning now to FIG. 7, a plurality of analog to digital converters 200 are respectively disposed in each channel 11a and coupled between the phone sets (1, 2, 3, etc.) and the inputs to the switch matrix 12. Each converter is effective to translate the respective audio analog signals inputted thereto to digital audio signals modulated in accordance with the analog information. Specifically, as subsequently described in accordance with a preferred embodiment, the resulting digital signal pulses have their widths modulated in accordance with the analog information. Each of the outputs from the A to D converters 200 are then respectively coupled to the corresponding inputs of the input switch modules $I_1$, $I_2$, etc. in the same manner as previously described with respect to FIG. 2. In the illustrated example of FIG. 7 there are eight such inputs to each of eight input switch modules, with specific reference, for convenience of description, being to one such input switch module $I_1$. Similarly, for convenience, FIG. 8 specifically depicts one of the eight output switch modules $O_8$ coupled to telephone sets 57, 58, ... 64.

Coupled to the outputs from matrix interface means 71 (FIG. 7) are a plurality of integrated circuit digital switching networks 301–308 for selectively coupling one of the input buses of module I, to an output bus therefrom. Accordingly, each input bus would be respectively coupled to an input terminal 1', 2', 3', etc. (corresponding to phone channels 1, 2, 3, etc.) of the networks 301–308, the output terminal of each switching network 301-308 being respectively coupled to the output terminals A-H. The leads P, Q, R pass through a 3 bit to 1 out of 8 row select decoder to enable only one of the switching networks 301–308, in accordance with which of the leads R1-R8 is logically high. The leads X, Y, Z go to all networks 301–308 to select one of the eight crosspoints within the enabled network, as will be described with reference to FIG. 9.

While various types of circuitry may be employed for each of the switching networks 301, 302, 303, etc., one such type is depicted in FIG. 9. As can be easily seen from a comparison of the network illustrated in FIG. 9 and its use in the manner shown in FIG. 7 (and 8), each switching network 301, 302, etc. functionally provides, in effect, an entire row of switches 60 (FIG. 2) for the input switch module $I_1$. Thus, in the example of an 8×8 switch module, network 301 provides the first row of switches 60, network 302 provides the second row, and digital switching network 308 would provide the last row thereof.

The closing of a crosspoint of the input switch module $I_1$ is now described. Accordingly, assume that the digitized audio signal from phone 3 is to be coupled to output B from module $I_1$. To effect such coupling, the address of the crosspoint to be closed in the input stage is that one at the intersection of the third input bus and the second output bus of switch module $I_1$. The signal on leads 100 would contain this address, and the matrix interface 71 will effect the required conversion of the digitally encoded address signal. The lead SELECT $I_1$ would be high; the leads P, Q, R would be 0, 0, 1 to indicate digital switching network 302; and the leads X, Y, Z would be 0, 1, 0 to indicate the third input terminal. As a result, the input terminal 3' of switching network 302 would be connected with the output terminal therefrom, and the digitized audio signal would be transmitted from the third channel input bus to terminal B. In similar manner, the digitized audio signals can be switchably routed through the intermediate and output stages of the switch matrix 12. Thereafter, the digital to analog converters 500 respectively reconvert the pulse width modulated digitized audio signals at the output of matrix 12 to analog signals which are coupled to the appropriate earpieces of the telephone stations 10.

In the system according to the present invention, there is no actual opening of a crosspoint. When a connection between telephone stations is to be terminated, processor 21 causes the appropriate stations to be disconnected from matrix 12, by means not shown. The crosspoints within matrix 12 defining that connection remain enabled but processor 21 alters memory 22 to remove those crosspoints from a "reserved" list in the memory so that those crosspoints may be reassigned for a subsequent connection.

Referring now to FIG. 10, a preferred form of the analog to digital converter 200 is depicted. Accordingly, the converter comprises three high input impedance, large bandwidth inverting amplifier stages 201, 202, and 203, a capacitor 204 providing positive feedback from the output of amplifier stage 202 to the input of amplifier stage 201, a resistor 205 providing negative feedback from the output of amplifier 203 to the input to amplifier 201. A positive supply voltage preferably one-half the value of the voltage supply to the amplifiers is coupled across resistor 206 and capacitor 207.

The entire network 200 oscillates to generate a continuous square wave signal at the output terminal 210. When the analog audio signal is applied to the input terminal 211, the resulting variations in the magnitude thereof will alter the widths of each of the square wave pulses in accordance with the time varying analog signal.

Specifically, as the amplitude of the analog audio signal varies, the average voltage across capacitor 207 is correspondingly changed, which change is amplified by the stages 201, 202, and 203, to produce a corresponding change, in the opposite direction, at the output terminal 210. This varying voltage at the output terminal 210 is then coupled by way of resistor 205 to the high side of capacitor 207, readjusting the voltage across capacitor 207 toward its original value. Thus, the variations in the magnitude of the analog signal will produce corresponding variations in the avergage value of the output voltage at terminal 210 which is reflected by the varying pulse widths of the digital signal therefrom. Thus, the output signal at 210 is pulse width modulated in accordance with the analog signal information.

Referring now to FIG. 11, a preferred form of the D to A converter 500 comprises a suitable R-C filter network comprising resistor 501 and capacitor 502, the function of the converter 500 being to recover the average value of the voltage present in the digitized audio signal being inputted thereto and generate an analog signal representative thereof. This resulting analog signal thus contains the same audio information that was inputted to the switch matrix, and is coupled to the earphone of the called party telephone set.

Various modifications of the disclosed embodiments as well as additional embodiments may become apparent to those skilled in the art after reviewing the foregoing description without departing from the spirit and scope of the invention as defined by the following claims.

What is claimed is:

1. A stored program controlled switching system for effecting audio communication between respective telephone stations of a self-contained private automatic branch exchange telephone communication system, comprising:
   a. respective voice communication transmit and receive channels associated with the each one of said telephone stations,
   b. signal generators respectively associated with each of said telephone stations for generating signals indicative of a station being called,
   c. space division switch matrix means for selectively coupling the audio signal on a transmit voice communication channel of one of said telephone stations to a receive voice communication channel of another of said telephone sations, all of said transmit and receive communication channels being connected to said switch matrix means, said switch matrix means comprising a plurality of digital switches, selected ones when closed, establishing a communication path through said matrix for establishing communication between transmit and receive channels of selected called and calling stations,
   d. stored program processor means for generating a digitally encoded address signal in response to the receipt of digital command signals indicating a calling station and a station being called by said calling station, said processor means comprising means for determining the identification of switches of said switch matrix means to be closed in order to effect coupling of the voice communication channels of the calling and called stations, and means for generating said digitally encoded address signal representative of the so identified switches,
   e. line scanner means having respective inputs coupled to the signal generators of each telephone station and an output coupled solely to said stored program processor means, said line scanner means generating said digital command signals in response to, and representative of, the generated signals from said signal generators indicating the station being called and the identification of the calling station,
   f. switch matrix interface means interposed between said matrix means and said processor means, said interface means being responsive to said digitally encoded address signal from said processor means for providing enabling signals to said matrix means to selectively close certain ones of said digital switches in said switch matrix means defined by said address signal, thereby to establish said communication path,
   g. first converter means disposed in each voice communication transmit channel between said telephone station and said switch matrix means for converting analog audio signals from said telephone station to modulated signal pulses, the time difference between adjacent edges of said signal pulses being representative of said analog information, and
   h. second converter means disposed in each voice communication receive channel between said switch matrix means and said telephone station for reconverting said modulated signal pulses from said matrix to analog audio signals.

2. The system as defined by claim 1 wherein said first converter means comprises three inverting amplifier stages, positive feedback means coupling the output of said second stage to the input of said first stage, negative feedback means coupling the output of said third amplifier stage to the input of said first stage, and capacitor means coupling the input of said first stage to ground.

3. The system as defined by claim 2 wherein said second converter means comprises a low pass R-C filter network.

4. The system as defined by claim 1 further including reallocation means comprising means for initially determining the unavailability of a particular switch identified by said processor means to effect coupling of said voice communication channels and thereafter indentifying and substituting another switch to replace said unavailable switch.

5. A stored program controlled switching system for effecting audio communication between respective telephone stations of a self-contained private automatic branch exchange telephone communication system, comprising:
   a. respective voice communication transmit and receive channels associated with each one of said telephone stations, b. signal generators respectively associated with each of said telephone stations for generating signals indicative of a station being called, c. space division switch matrix means for selectively coupling the audio signal on a transmit voice communication channel of one said telephone stations to a receive voice communication channel of another of said telephone stations, all of said transmit and receive communication channels being connected to said switch matrix means, said switch matrix means comprising a plurality of digital switches, selected ones when closed, establishing a communication path through said matrix for establishing communication between transmit and receive channels of selected called and calling stations, d. stored program processor means for generating a digitally encoded address signal in response to the receipt of digital command signals indicating a calling station and a station being called by said calling station, said processor means comprising means for determining the identification of switches of said switch matrix to be closed in order to effect coupling of the voice communication channels of the calling and called stations, and means for generating said digitally encoded address signal representative of the so identified switches, e. line scanner means having respective inputs coupled to the signal generators of each telephone station and an output coupled solely to said stored program processor means, said line scanner means generating said digital command signals in response to, and representative of, the generated signals from said signal generators indicating the station being called and the identification of the calling station, f. switch matrix interface means interposed between said matrix means and said processor means, said interface means being responsive to said digitally encoded address signal from said processor means for providing enabling signals to said matrix means to selectively close certain ones of said digital switches in said switch matrix means defined by said address signal, thereby to establish said communication path, g. first converter means disposed in each voice communication transmit channel between said telephone station and said switch matrix means for converting analog audio signals from said telephone station to coded signals representative of, and modulated in accordance with, said analog information, and h. second converter means disposed in each voice communication receive channel between said switch matrix means and said telephone station for reconverting said coded signals from said matrix to analog audio signals;

i. said switching matrix means comprising input, output, and intermediate switching stages, each stage comprising a plurality of switch modules, respective inputs of the switch modules of the input stage being coupled by way of said first converter means to the mouthpieces of said telephone stations, respective outputs from the switch modules of the output stage being coupled by way of said second converter means to the earpieces of the telephone stations, and the outputs from the switch modules of the input stage and the inputs to the switch modules of the output stage being respectively coupled to the inputs and outputs of the switch modules in the intermediate stage.

6. The system as defined by claim 5 further including reallocation means comprising means for initially determining the unavailability of a particular switch identified by said processor means to effect coupling of said voice communication channels and thereafter identifying and substituting another switch to replace said unavailable switch.

* * * * *